United States Patent
Omata et al.

(10) Patent No.: US 6,476,573 B2
(45) Date of Patent: Nov. 5, 2002

(54) CONTROL APPARATUS FOR HYBRID VEHICLE

(75) Inventors: Yoshiaki Omata, Shizuoka-ken (JP); Kazuhiko Morimoto, Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/826,992

(22) Filed: Apr. 5, 2001

(65) Prior Publication Data

US 2001/0028233 A1 Oct. 11, 2001

(30) Foreign Application Priority Data

Apr. 5, 2000 (JP) ........................................ 2000-103017

(51) Int. Cl.[7] .............................. G05B 5/00; H02H 7/08; H02P 1/00; H02P 3/00; H02P 7/00
(52) U.S. Cl. ........................ 318/445; 318/473; 180/65.2
(58) Field of Search ................................ 318/445–450, 318/473; 180/65.2

(56) References Cited

U.S. PATENT DOCUMENTS

| | | | |
|---|---|---|---|
| 5,621,304 A | * | 4/1997 | Kiuchi et al. |
| 5,839,533 A | | 11/1998 | Mikami et al. |
| 5,841,201 A | | 11/1998 | Tabata et al. |
| 5,895,333 A | | 4/1999 | Morisawa et al. |
| 5,935,040 A | | 8/1999 | Tabata et al. |
| 6,018,198 A | * | 1/2000 | Tsuzuki et al. |
| 6,018,199 A | | 1/2000 | Shiroyama et al. |
| 6,109,237 A | | 8/2000 | Pels et al. |
| 6,114,775 A | * | 9/2000 | Chung et al. |
| 6,137,250 A | | 10/2000 | Hirano et al. |
| 6,234,932 B1 | | 5/2001 | Kuroda et al. |
| 6,335,573 B1 | | 1/2002 | Eguchi et al. |
| 6,335,574 B1 | | 1/2002 | Ochiai et al. |
| 6,345,216 B1 | | 2/2002 | Morimoto et al. |
| 6,348,771 B1 | | 2/2002 | Morimoto et al. |
| 2001/0011050 A1 | | 8/2001 | Yamaguchi |
| 2001/0023790 A1 | | 9/2001 | Hasegawa |
| 2001/0028171 A1 | | 10/2001 | Omata et al. |
| 2001/0037645 A1 | | 11/2001 | Morimoto et al. |
| 2001/0040060 A1 | | 11/2001 | Morimoto et al. |
| 2001/0049571 A1 | | 12/2001 | Shimizu et al. |
| 2002/0014869 A1 | | 2/2002 | Omata et al. |
| 2002/0014872 A1 | | 2/2002 | Morimoto et al. |
| 2002/0020571 A1 | | 2/2002 | Morimoto et al. |
| 2002/0021007 A1 | | 2/2002 | Morimoto et al. |
| 2002/0028726 A1 | | 3/2002 | Morimoto et al. |

FOREIGN PATENT DOCUMENTS

| | | |
|---|---|---|
| JP | 6-257484 | 9/1994 |
| JP | 8-93517 | 4/1996 |
| JP | 10-47104 | 2/1998 |
| JP | 10-136508 | 5/1998 |

* cited by examiner

Primary Examiner—Jeffrey Donels
(74) Attorney, Agent, or Firm—Flynn, Boutell & Tanis, P.C.

(57) ABSTRACT

A motor control apparatus for a hybrid vehicle, wherein during operations of automatic start-up/stop control of the engine, at restarting of the engine when a start-up condition is satisfied, the control means controls to said electric motor so as to start up engine by the electric motor only, during operation of automatic start-up/stop control of the engine, at restarting of the engine when a start-up condition is not satisfied, a controller controls to drive a starter motor and an electric motor by outputting an engine activation signal so that the starter motor is always assisted by the electric motor during engine start. The electric motor is started by voltage supplied by the main battery. By such system, the engine and motor are not collectively controlled, and simplification of the system is achieved. Further, synchronism of the engine and motor is obtained and quietness at restart of the engine also results.

13 Claims, 9 Drawing Sheets

CONTROL APPARATUS FOR HYBRID VEHICLE

FIELD OF THE INVENTION

This invention relates to a control apparatus for a hybrid vehicle, which provides an electric motor directly connected to an engine having both driving and power-generating functions, and which executes an automatic start-up/stop control of the engine.

BACKGROUND OF THE INVENTION

Some motor vehicles are of a type commonly called a hybrid vehicle having an internal combustion engine driven by combustion of fuel and an electric motor (herein described as "motor") driven by electric energy, wherein the motor is directly connected to the engine and also has a power-generating function. The hybrid vehicle further includes an engine control means for controlling a running state of the engine and motor control means for controlling an operating state of the motor. The engine control means and the motor control means detect respective operating states of the engine and the motor when the vehicle is traveling, and then exchange such detected data regarding the running states. As a result, the respective operating states of the engine and the motor are controlled in association with one another. Such a control system attains a high level of required performance (such as fuel efficiency, lower values of detrimental components in exhaust gases, and power performance). The apparatus includes a main battery which supplies drive electricity to the motor and is charged by recharging power-generation by the motor. A required amount of battery charge must be maintained in order to perform suitable driving power-generation/driving prohibition for the motor. This apparatus administers the battery.

Moreover, there is a hybrid vehicle which has an automatic start-up/stop control means to improve mileage and/or reduce release of effluent gas, by stopping an engine forcibly at an idling state.

One such example of a control apparatus of a hybrid vehicle is disclosed in published Japanese Application Laid-Open No. 10-136508. In the hybrid vehicle of this disclosure an engine usually starts up by cranking a motor. But when a start-up by a motor is impossible, an engine start control means controls start up by cranking the engine with a starter motor. Therefore, when engine start up by cranking of a starter motor is required, the engine start control means functions to assist cranking of the engine.

Incidentally, during operation of automatic start-up/stop control, at a restart-up of an engine and a restart-up in an idle stop, a control apparatus of a traditional hybrid vehicle judges whether an engine is started by electric motor only or starter motor only. But this system must control collectively the engine and the motor. Accordingly, the system is complicated in hardware and software, and becomes expensive.

In order to obviate or minimize the above problem or expense, the present invention provides a control apparatus for a hybrid vehicle having a motor directly connected with an engine mounted on the vehicle. The motor has both driving and power-generating functions. The control means executes automatic start-up/stop control of the engine. The control means starts up the engine using a starter motor by operation of a key and assists start up using the electric motor. During automatic start-up/stop control of the engine, at restarting of the engine when a start-up condition is satisfied, the control means controls to start up the engine using only the electric motor. At restart-up of the engine when a start-up condition is not satisfied, the control means drives the starter motor and the electric motor by outputting an engine activation signal so that the starter motor is assisted by the electric motor.

The engine control means and motor control means operate independently. In particular, in a start-up system, the engine control means operates as master, and the motor control means operates as slave. in this system, the engine and motor are not collectively controlled, and simplification of the system is achieved in both hardware and software. In addition, synchronism of the engine and the motor is achieved, and both certain start-up and restart-up of the engine are gained. Furthermore, quietness at restart-up of the engine is gained. Fundamentally, the electric motor is started by voltage from a main battery when the voltage value exceeds a predetermined voltage. In this system, the electric motor assumes the role of starter motor when an appropriate water temperature and battery voltage are sensed. The arrangement improves the durability of the starter motor. In addition, life of the sub-battery is improved.

DETAILED DESCRIPTION OF THE INVENTION

Figure 1:
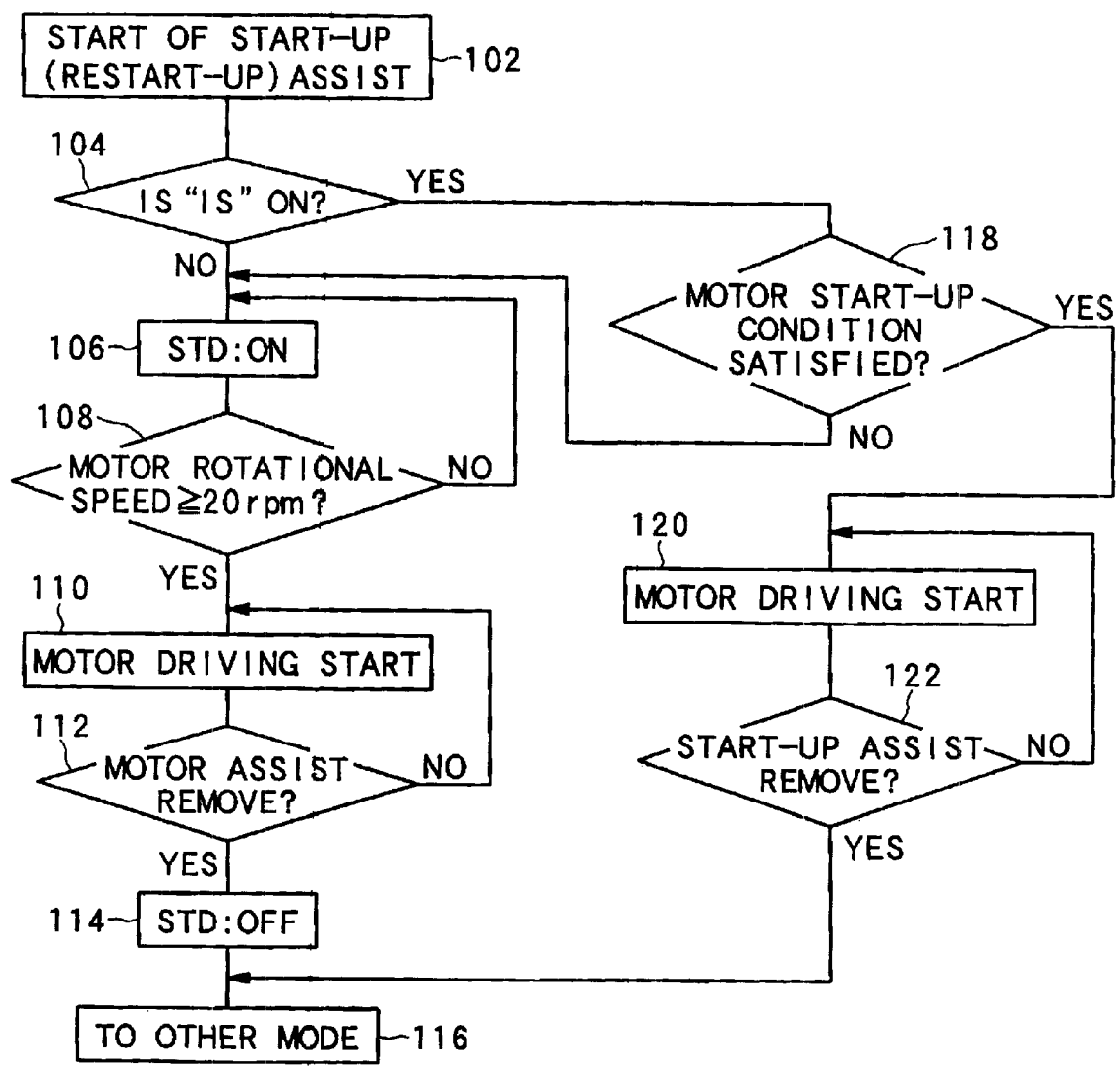
FIG. 1 is a control flowchart of a start-up (or restart-up) control mode.

A detailed and concrete explanation will be given of embodiments according to the invention in reference to the drawings as follows. FIGS. 1–9 show embodiments according to the invention. FIG. 9 shows an engine 2 mounted on a hybrid vehicle (not shown); an electric motor 4 (hereafter described as "motor"); a clutch 6; a transmission 8; and a control apparatus 10. The engine 2 drives by combustion of fuel. The motor 4 drives by electric energy and has a power-generating ability. The motor 4 is directly connected with a crank axis (not shown) of engine 2. The clutch 6 transmits and cuts off an engine output to the transmission side.

The engine 2 includes an alternator 12 for power-generation, an air-compressor 14 for an air-conditioner, a starter motor 16 for starting the vehicle, a sub-radiator 18, and an electrically-driven water pump 20. The alternator 12 and the air compressor 14 are connected to the crank shaft by pulleys and belts (not shown). The starter motor 16 has a pinion gear engaging with a ring gear (not shown) and is connected to the flywheel (not shown) through a gear mechanism.

The engine 2 and the motor 4 are connected to a control means 22. The control means 22 constitutes an economical run control means, and executes an automatic start-up/stop control (economical run control) of engine 2. In addition, the control means has an engine control means (priority controller) 24 executing as a master at start-up and a motor control means 26 executing as a slave at start-up. The engine control means 24 is linked to a sub-battery 28 (12V). The sub-battery 28 is coupled to the alternator 12, the starter motor 16, the subradiator 18, and the electric water pump 20.

The motor 4 is connected to a motor control means 26, which is linked to a main battery 30 (192V). The main battery 30 supplies driving electric power to the electric motor 4, and is charged by generated electric power from the motor 4, connecting with the motor control means 26.

Figure 7:
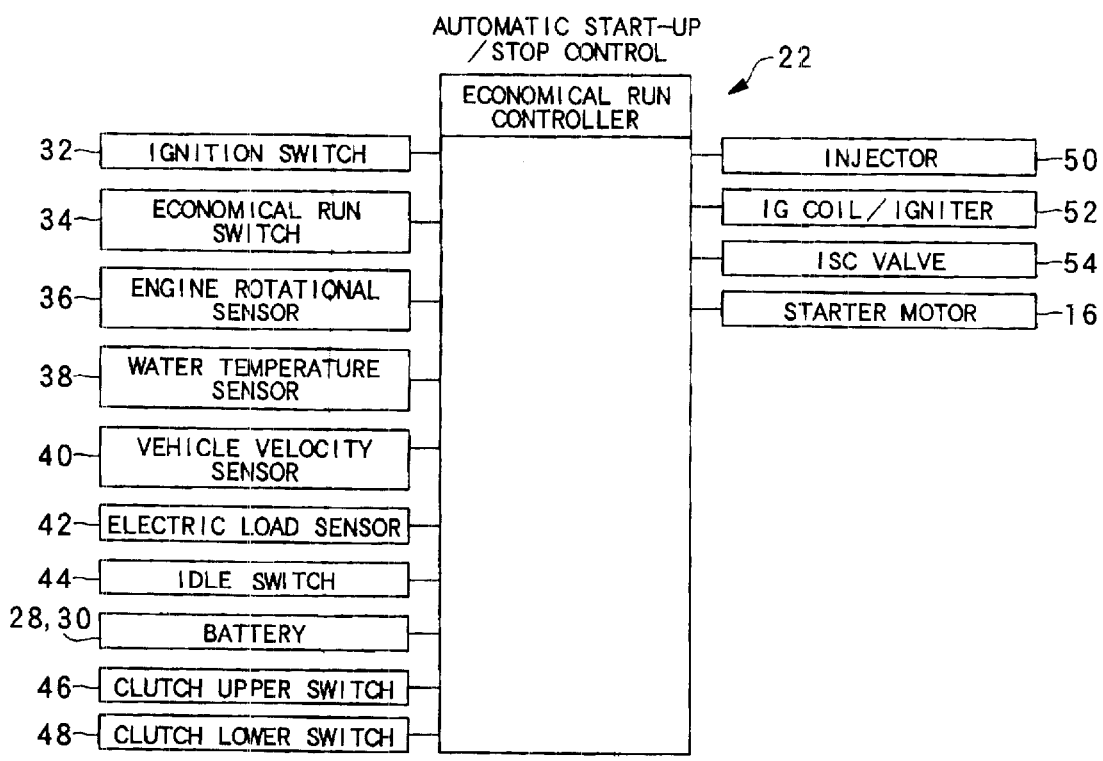
FIG. 7 is a block diagram showing each sensor linking with a control means.

Further, the control means 22, as shown in FIG. 7, is connected at the inside to: an ignition switch 32; an economical run switch 34; an engine rotational speed sensor 36; a water temperature sensor 38; a vehicle speed sensor 40; an electric load sensor 42; an idle switch 44 which comes on when the engine 2 is in an idle driving state; a sub-battery 28 and a main battery 30 performing battery functions; a clutch upper switch 46; and a clutch lower switch 48. The control means 22 is connected at the output side to: an injector 50; IG coil/igniter 52; an ISC (idle speed control) valve 54 and a starter motor 16.

Figure 8:
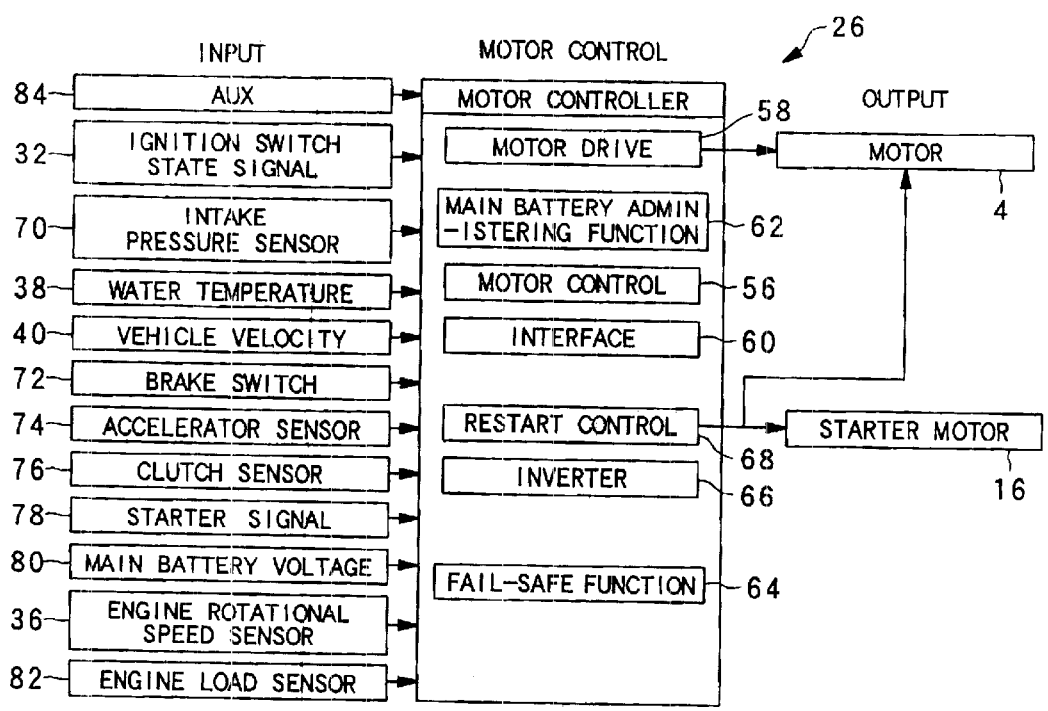
FIG. 8 is a block diagram showing each sensor linking with a motor control means.
Figure 9:
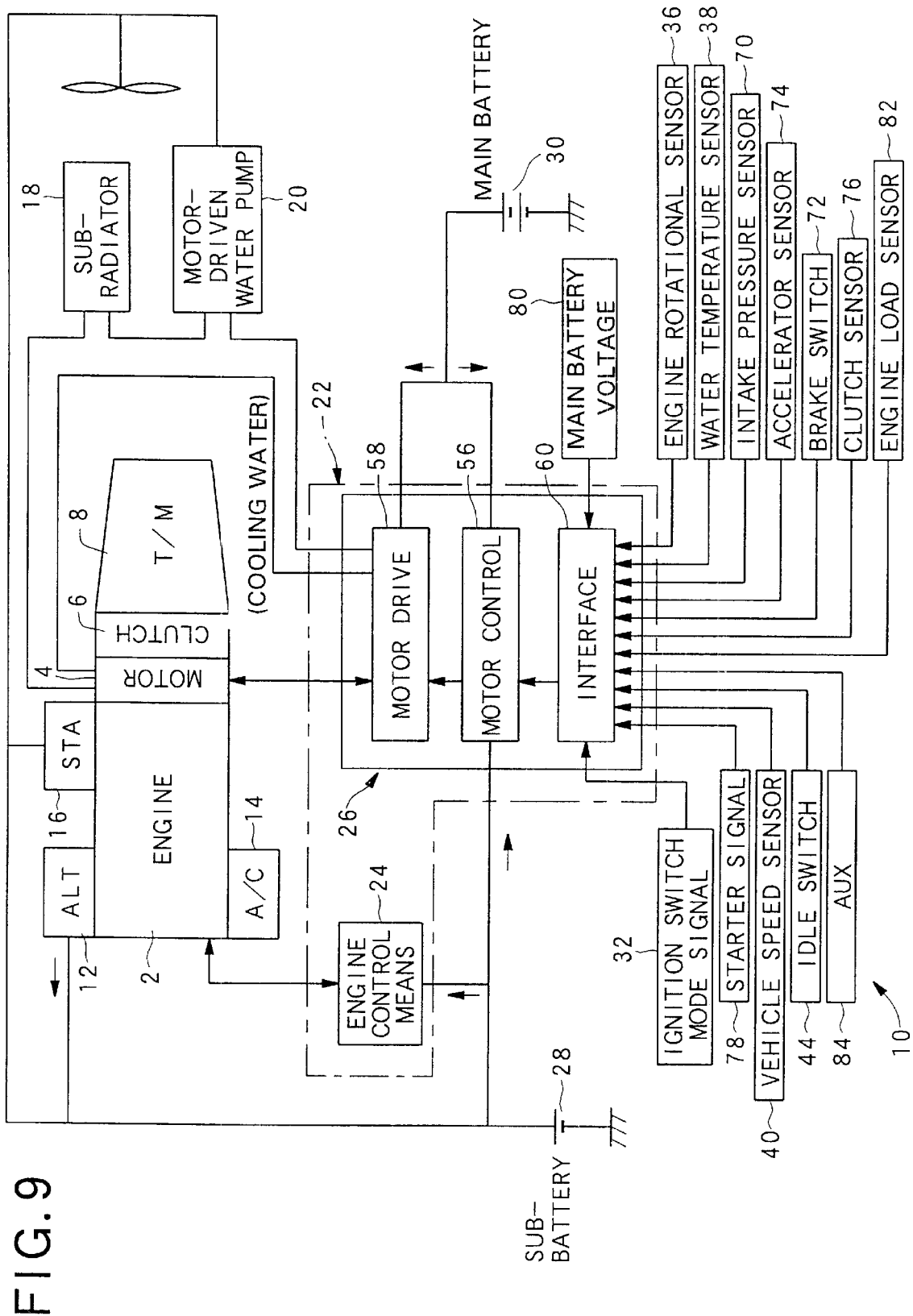
FIG. 9 is a diagram showing a system of a control apparatus.

The motor control means 26, as shown in FIG. 8, includes a motor control section 56, a motor drive section 58, an input/output processing section (interface) 60, a main battery administrating section 62, a fail-safe section 64, an inverter 66 and a restart-up control section 68.

The motor control means 26, as shown FIG. 8, is connected at the input side to: ignition switch 32; intake pressure sensor 70; water temperature sensor 38; vehicle velocity sensor 40; brake switch 72; accelerator sensor 74; clutch sensor 76; starter switch 78; main battery voltage detector 80; engine rotational speed sensor 36; engine load sensor 82; and auxiliary input (AUX) 84. The motor control means 26 is connected at the output side to: motor 4 linking with a motor drive section 58 and a restart-up control section 68; and a starter motor 16 linking with restart-up control section 68.

Figure 6:
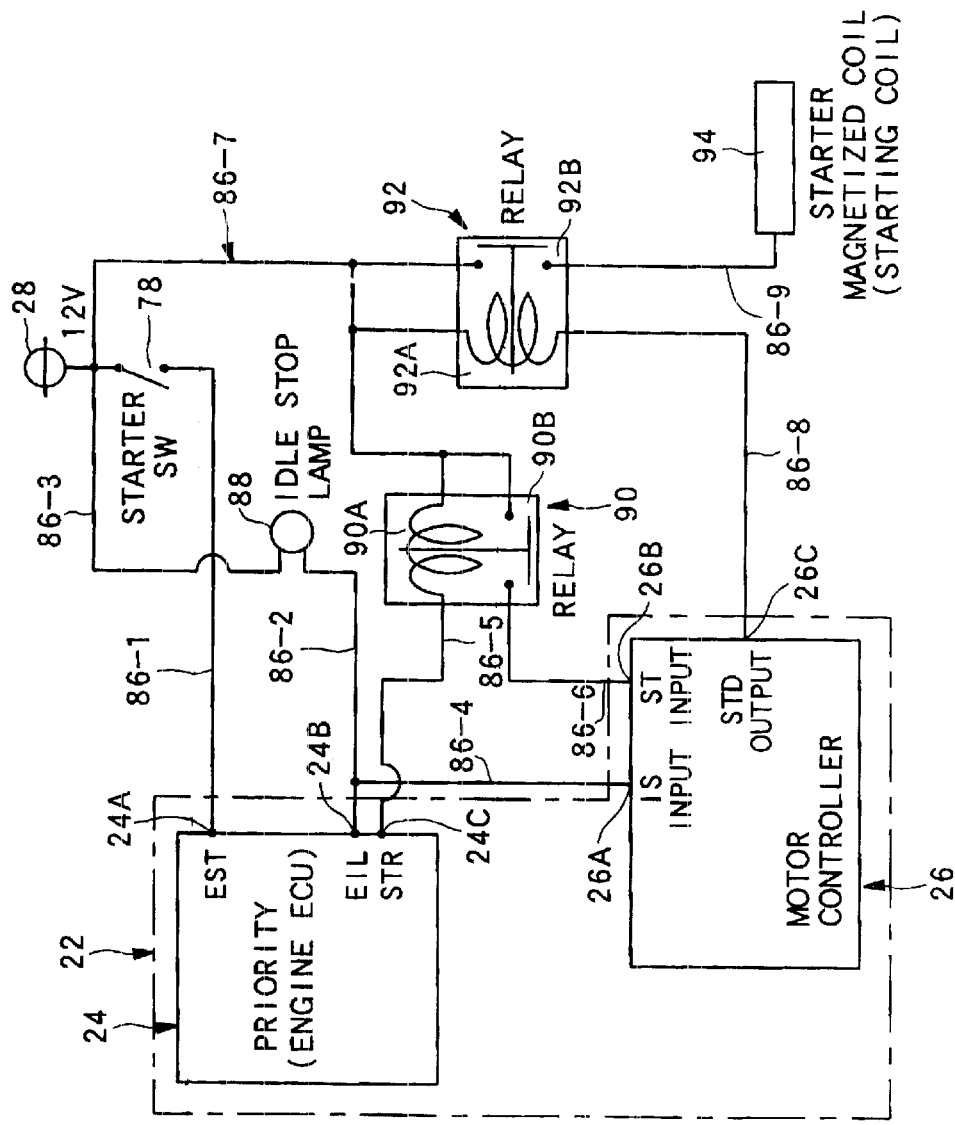
FIG. 6 is a block diagram showing a signal line state of hardware and the control means.

In the control means 22, a signal connecting state of the engine control means 24 and the motor control means 26 is shown in FIG. 6. The engine control means 24 is connected at starter "ON" signal (EST) output 24A to starter switch 78 linking with the sub-battery 28 by a first signal line 86-1. The engine control means 24 is connected at idle stop execution signal (EIL) output 24B to idle stop lamp 88 by a second signal line 86-2. The idle stop lamp 88 is linked to the sub-battery 28 by a third signal line 86-3. The second signal line 86-2 is connected to the fourth signal line 86-4 linking to an idle stop execution input signal (IS or IS-SW) input 26A of the motor control means 26. Further, the engine control means 24 is connected at starter motor-driving signal (STR) output 24C to a first coil part 90A of a first starter drive relay 90 through a fifth signal line 86-5. The first contact member 90B of the first starter drive relay 90 is connected to a starter switch-on input signal (ST) input 26B of the motor control means 26 through a sixth signal line 86-6. The first starter drive relay 90 is connected to sub-battery 28 through a seventh signal line 86-7. The seventh signal line 86-7 is connected to a second starter drive relay 92. The second coil part 92A of the second starter drive relay 92 is linked to a starter driving relay signal (STD) output 26C of the motor control means 26 through an eighth signal line 86-8. In addition, the second contact member 92B of the second starter drive relay 92 is linked to a starter magnetized coil 94 through a ninth signal line 86-9.

The motor control means 26 supplies driving electric power to the motor 4, and inputs a main battery voltage signal from the main battery voltage detector 80 detecting a main battery voltage of a main battery 30 charged by generated electric power from the motor 4. Further, the motor control means 26 governs the main battery mode by the main battery state administrating section 62.

Figure 5:
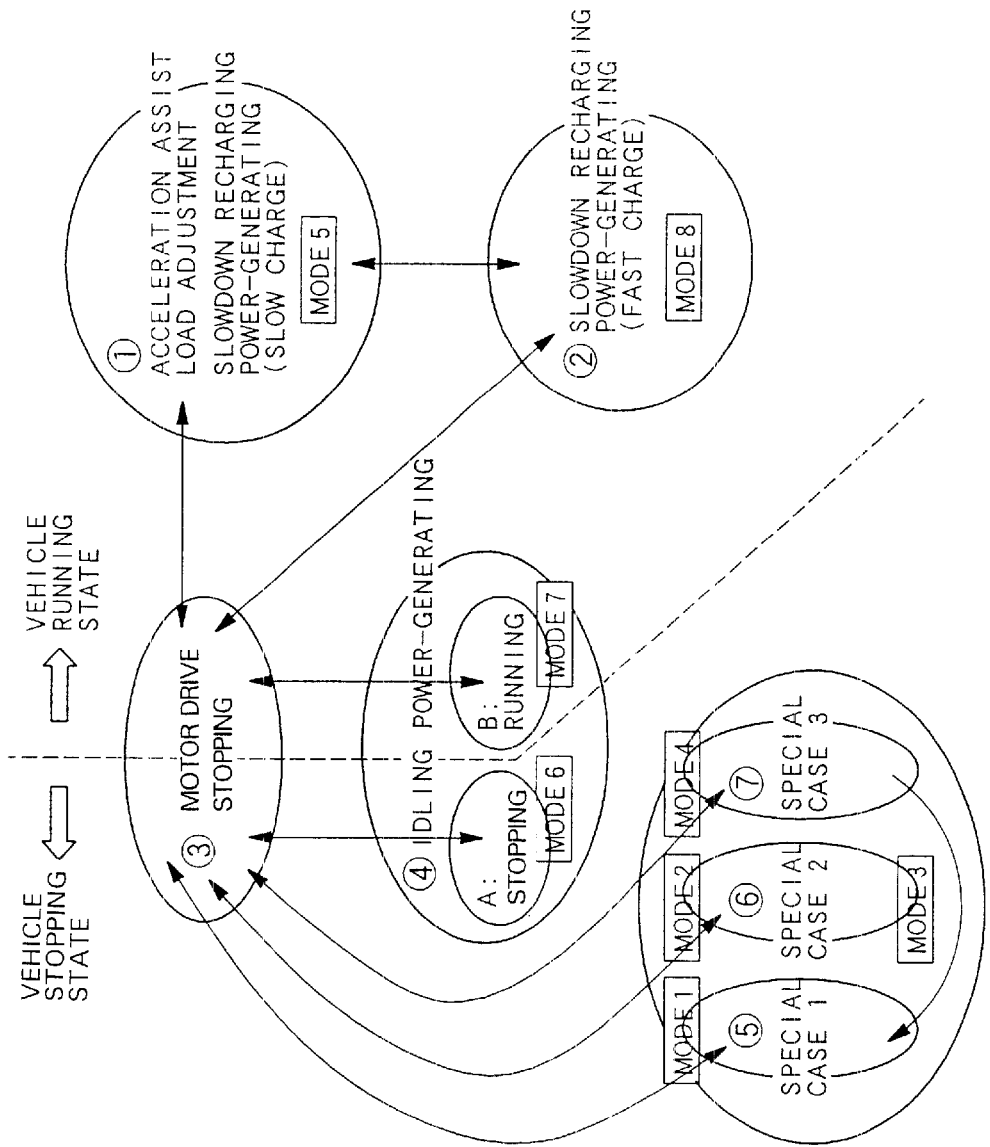
FIG. 5 is a schematic diagram showing switchover of a motor assisting control state.

The control states of motor 4, as shown in FIG. 5, for example, are of the following seven kinds: first control state (1): an acceleration assist, a load adjustment and slowdown recharging power-generation (slow charge), mode 5; second control state (2): slowdown recharging power generation (fast charge), mode 8; third control state (3): motor drive stop (state waiting whether each switchover condition is satisfied); fourth control state (4): idling power-generation (A: stopping and B: running), mode 6 and mode 7; fifth control state (5): special case 1 in special case control (start assist), mode 1; sixth control state (6): special case 2 in special case control (start-up assist), mode 2 (waiting) and mode 3 (executing); and seventh control state (7): special case 3 in special case control (engine rotational speed stabilization assist), mode 4.

A control state of this motor 4, as shown in FIG. 5, switches over by a driving state of the vehicle. In other words, during each execution of first (1), second (2) and fourth (4) control states, when a switchover condition of special case control (special case 1 to 3) is satisfied, then the first (1), the second (2) and fourth (4) control states are forcibly removed, and the control state switches over to special case control (special case 1 to 3) through motor driving stop in the third control state (3). In addition, the special case control (special cases 1 and 2) does not switch over to the other special case control directly. Each special case control (special cases 1 to 3) after a switchover does not switch over to other control states until a decontrol condition is satisfied. However, special case control (special case 3) switches over to special case 1, when the switchover condition of the first control state (1) is satisfied, before a decontrol condition is satisfied.

The control means 22 has a typical MAP-ST (a start assist map). The control means executes an automatic start-up/stop control of engine 2 when the engine is in an idling state and the vehicle is in a stopping state. The control means controls to start with starter motor 16, and to always assist by motor 4 at starting-up of engine 2 by an ignition key (not shown) linked to ignition switch 32. In addition, during operations of automatic start-up/stop control of engine 2, at restarting of the engine when a start-up condition is satisfied, the control means controls to drive motor 4 so as to start up engine 2 by the electric motor 4 only. During operation of automatic start-up/stop control of engine 2, at restarting-up of engine 2 when a start-up condition is not satisfied, the control means controls to drive starter motor 16 and electric motor 4 by outputting an engine activation signal so as to always receive assistance from motor 4 when starting the engine with the starter motor. The above-mentioned start-up condition is satisfied when the following conditions are satisfied: DC voltage is a voltage$\geq$197V (voltage of main battery 30$\geq$197V); engine water temperature is $\geq$80 degrees; and torque is not in a torque limit (when a torque limit to protect motor 4 is not needed and control state is normal).

In addition, the control means 22 controls to delay driving of motor 4 until a predetermined time after an engine activation signal is output.

In addition, at a restart-up of engine 2 when satisfying a start-up condition while the engine is stopped by operation of automatic start-up/stop control, the control means 22 controls to stop promptly driving of the motor 4, when a start-up of the engine 2 is not successful by motor 4 only during a predetermined time, or when a start-up of the engine 2 is obtained by operation of an ignition key.

Moreover, in the drive control of motor 4, when an engine drive signal to starter motor 16 is input by operation of an ignition key, then the control means 22 controls to start driving of the motor after an enough or rotation condition that the starter motor 16 begins to drive is satisfied. The enough condition that the starter motor 16 begins to drive is as follows: after a constant predetermined time period has passed after the input of an engine activation signal; or when the engine rotational speed has exceeded a set predetermined rotational speed.

Figure 2:
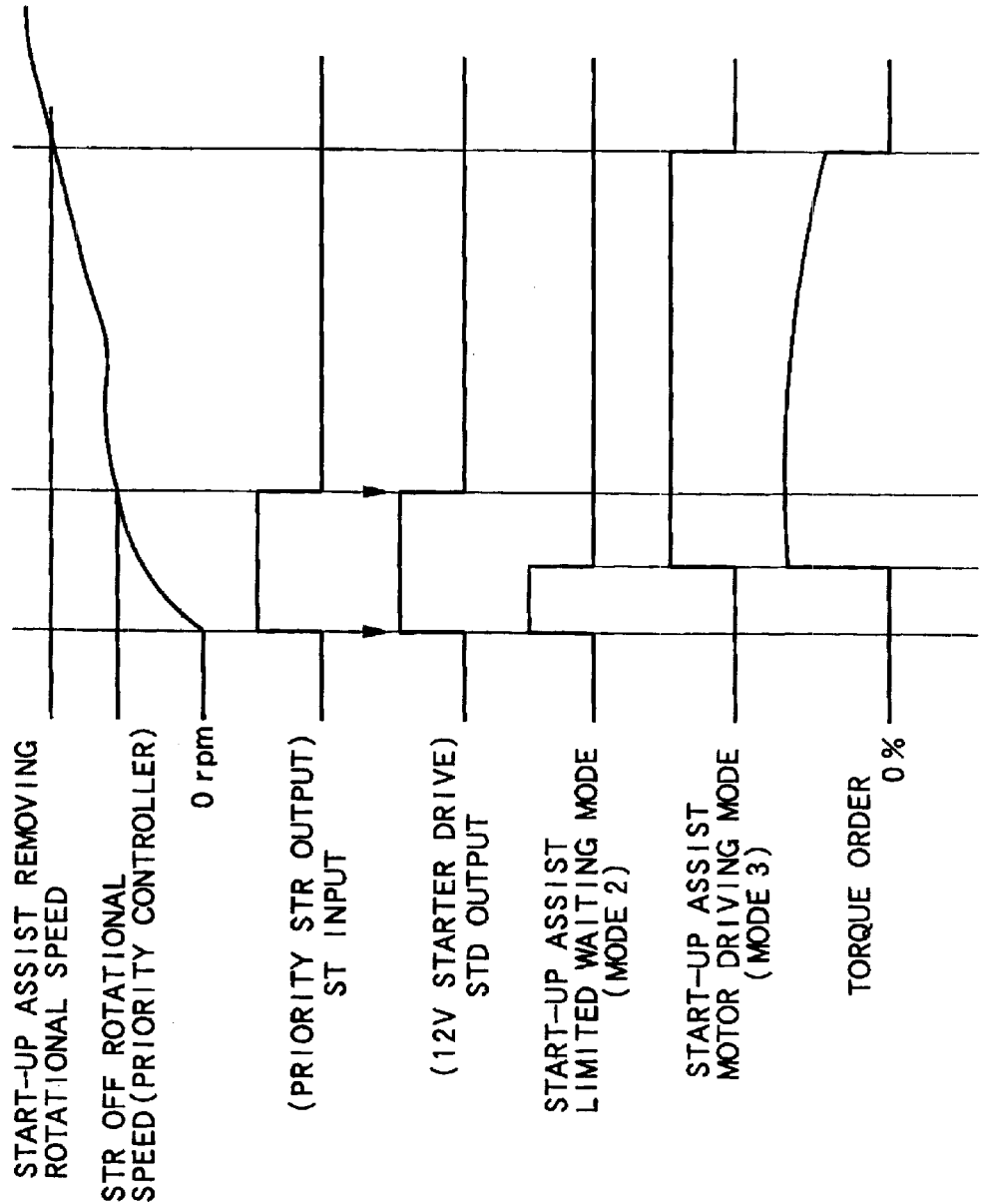
FIG. 2 a time-chart showing a first start-up assisting mode control.
Figure 3:
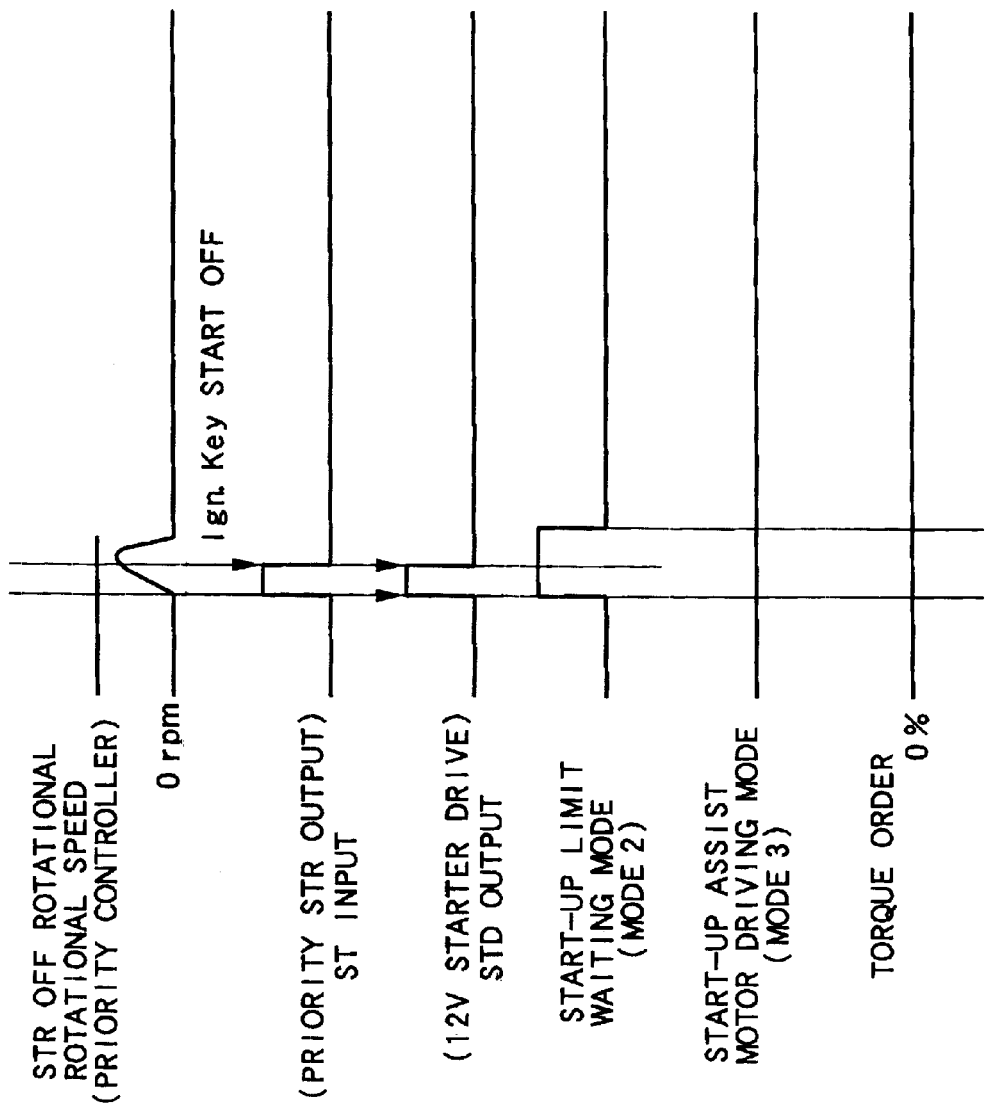
FIG. 3 is a time-chart showing a second start-up assisting mode control.
Figure 4:
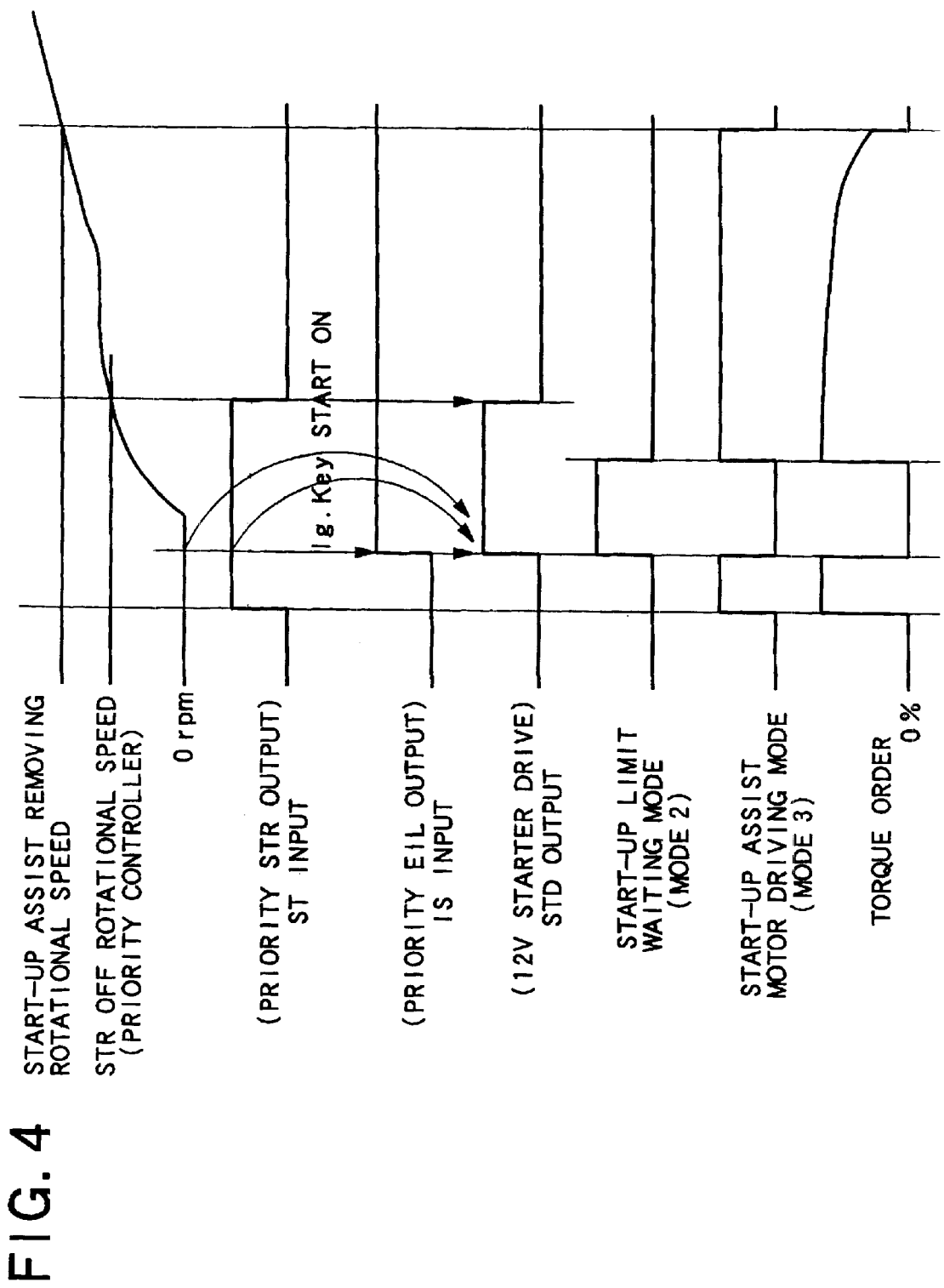
FIG. 4 a time-chart showing an emergency operation control at an idle stop restart-up.

Operation of the embodiment will now be described with reference to a flowchart in FIG. 1 and time charts in FIGS. 2 through 4.

When a controlling program to start assist for restart of engine 2 starts control at step 102, then a determination is made at step 104 as to whether an idle stop execution signal (EIL or IS) is input. In other words, "Is IS ON?" is determined at step 104. When the determination at step 104 results in "NO", in other words, when an input signal of an idle stop (IS) is "H", and when idle stop is not executed (when automatic startup/stop control is not executed), then 12V starter relay drive signal (STD) is output (STD: "ON") at step 106. Then both first and second starter drive relays 90, 92 are switched to "ON". Thus, starter motor 16 is driven by sub-battery 28. At step 108, the engine rotational speed of motor 4 being equal to or more than a set predetermined rotational speed, (engine rotational speed ≧20rpm) is determined. When the determination in step 108 is "NO", then the routine is returned to step 106.

When the determination in step 108 is "YES", then driving of motor 4 is executed by a search value of MAP-ST (start-up assist map) at step 110. Driving of the motor 4 works by a start assist torque value or order.

Therefore, when an input signal of idle stop (IS) is "H", and idle stop is not executed, then the engine starts by using both the electric motor 4 and starter motor 16.

A determination is made at step 112 as to whether a start-up assist is removed. When the determination in step 112 is "NO", then the routine is returned to step 110.

When the determination in step 112 is "YES", then an output of the 12V starter relay drive signal (STD) is stopped at step 114 (STD: OFF), and both first and second starter drive relays 90, 92 are switched off. The routine is switched over to another mode at step 116.

When the determination in previous step 104 is "YES", in other words, when an input signal of idle stop (IS) is "L", and when idle stop is executed (when automatic start-up/stop control is executed), then a determination is made at step 118 as to whether a startup condition of motor 4 is satisfied. This start condition agrees when all of the following conditions are satisfied: DC voltage ≧197V (voltage of main battery 30 ≧197V); engine water temperature is ≧80 degrees; and torque is not in a torque limit (when a torque limit to protect motor 4 is not needed and control state is normal).

When the determination in previous step 118 is "NO", the start-up condition is not satisfied, and the routine is returned to step 106. Therewith, the control means controls to output a 12V starter relay drive signal (STD) (STD: "ON") and to switch both first and second starter drive relays 90 and 92 on so as to start-up engine 2 by using both the electric motor 4 and the starter motor 16. Starter motor 16 is driven by subbattery 28, and when rotational speed of motor 4 is more than a set rotational speed (20 rpm), then driving of electric motor 4 is started by a search value from MAP-ST (start-up assist map) at step 110.

When the determination in step 118 is "YES" indicating that the above-mentioned start-up condition is satisfied, then driving of motor 4 is started by a search value from MAP-ST (start-up assist map) at step 120 so as to start up engine 2 using only the electric motor.

A determination is made at step 122 as to whether start-up assist is removed. When the determination in step 122 is "NO", the routine is returned to step 120. When the determination in step in 122 is "YES", then the routine is returned to step 116.

In addition, when a starter switch-on signal (ST) is input (ON), then a starter relay drive signal (STD) is output (ON). Furthermore, when input of a starter switch-on signal (ST) is stopped (OFF), then the output of a starter relay drive signal (STD) is stopped (OFF). In addition, a start-up assist control mode is not removed even if input of a starter switch-on signal (ST) is stopped (OFF), but is continued. In this case, as shown in FIG. 2, after an assist by motor 4 is begun once, this control mode is independent of a starter switch-on signal (ST).

When an engine activation signal is not output before electric motor 4 is driven, then driving of motor 4 is stopped. As shown FIG. 3, during periods of a start-up assist limited waiting mode (mode 2), when input of starter switch-on signal (ST) is stopped (OFF), then a start-up assist motor drive mode (mode 3) is not performed. In other words, at the start-up assist limited waiting mode (mode 2) before a motor assist begins, when input of starter switch-on signal (ST) is stopped (OFF), then motor assist is not performed.

Moreover, in the drive control of motor 4, when an engine drive signal to starter motor 16 by operation of an ignition key is input, then the control means 22 controls to start driving of motor 4 after an enough or rotation condition that starter motor 16 begins to drive is satisfied. The reason to include start assist limited waiting mode (mode 2) at the input of a signal driving a starter (STR) is as follows. If a ring gear in a crank axis side is stopped, a pinion gear of the starter motor 16 can engage with a ring gear. Accordingly, start assist limited waiting mode (mode 2) takes enough time until a ring gear engages with pinion gear. If there are other methods able to count until exceeding a set time period (sec) or a set rotational speed (rpm) is detected, such methods are acceptable.

In addition, as emergency operation occurs at a restart during operation of automatic start-up/stop control of engine 2, at restart time of engine 2 when satisfying a restart condition, when a start-up of engine 2 by electric motor 4 only is not successful. When a start-up of engine 2 by ignition key is added, then driving of the electric motor 4 is immediately stopped. Accordingly, as shown in FIG. 4, when a restart-up of motor 4 only is performed, and when engine 2 is not rotated by motor 4, then for emergency operation, this system uses starter motor 16 by operation of the ignition key, and the following control is executed in order to smoothly perform the operation.

The control is performed by a control operation of inverter 66. Inverter 66, inputs a starter switch-on signal (ST) (output of starter drive signal (EIL) of engine control means 24, to start only motor 4 (in a restart of idle stop).

When an input state of a starter switch-on signal (ST) is stopped (ON→OFF) (output of idle stop execution signal (EIL) of engine control means 24), and when rotational speed of motor 4≧5 rpm is satisfied, then start-up of motor 4 only is stopped. By driving both the motor by main battery 30 and driving the starter motor 16 by sub-battery 28, the engine 2 is started. But, when the above-mentioned condition is not satisfied, start-up by motor 4 only is continued.

Therefore, in this embodiment, a start-up of engine 2 by operation of an ignition key is started by starter motor 16, and motor 4 assists so that engine rotational speed increases, and a restart of engine 2 during idle stop is performed by the motor 4. When a restart of engine 2 during idle stop is performed by the motor 4, and when the ability of main battery 30 is judged to be insufficient, then the restart of engine 2 is started by starter motor 16 and is assisted by motor 4. In other words, the motor always assists even if engine 2 is started by starter motor 16. In addition, when operation of an ignition key has finished incompletely, then motor 4 does not assist, maintaining an initial state (FIG. 3). Furthermore, even if it is judged that a restart by motor 4 is permitted, when restart by motor 4 cannot be performed, starter motor 16 assists start up by momentary operation of the ignition key. The motor drive order is cancelled in conjunction with operation of the ignition key. After being discontinued once, when the engine 2 starts up early and quickly enough with operation of the ignition key, then the operation of the ignition key is cancelled.

As a result, in control means 22, engine control means 24 and motor control means 26 operate independently. In particular, in a start-up system, the engine control means 24 operates as master, and the motor control means 26 operates as slave. By this system, when adding motor 4 and motor control means 26 to engine 2 and engine control means 24, an existing system may be almost unchanged. This system is of one kind of a control state and uses one start assist map (MAP-ST) as before, and is arranged simply in both hardware and software. In addition, engine 2 and motor 4 may be not collectively controlled, so the system is simplified. In addition, synchronism of engine 2 and motor 4 is gained, and certain start-up and restart-up of engine 2 is gained. Furthermore, improved quietness at restart of engine 2 can be obtained. Fundamentally, motor 4 is started up by a high voltage supplied from main voltage battery 30 which fully shows its function. In this system, as motor 4 plays the role of starter motor 16 when proper water temperature and battery voltage are present, and always is operated. Thus, the durability and life of starter motor 16 improved. In addition, the life of the subbattery 28 is improved.

Moreover, the control means 22 controls to stop driving of motor 4 when an engine activation signal is not output before the electric motor 4 is driven. Hence, when intention of start-up of a driving person is not clear, an assist by motor 4 does not execute. Therefore, the volume of main battery 30 is not decreased unnecessarily, and life of the battery 30 can be increased.

In addition, at a restart-up of engine 2 when satisfying a start-up condition during operation of automatic start-up/stop control of engine 2, the control means controls to promptly stop driving of motor 4, when a start-up of engine 2 is not successful by motor 4 only, or when a start-up of engine 2 is added to by operation of an ignition key. When a start-up of engine 2 by motor 4 only has failed, and when starter motor 16 starts newly by operation of an ignition key, then drive of motor 4 is promptly stopped. Consequently, battery life can be maintained for a long time.

Moreover, in the drive control of motor 4, when an engine drive signal to starter motor 16 by operation of an ignition key is input, then the control means 22 controls to start driving of the motor 4 after an enough or rotation condition so that starter motor 16 begins to drive, is satisfied. Consequently, at the beginning drive of starter motor 16, the motor 4 is always stopped.

The invention claimed is:

1. A control apparatus for a hybrid vehicle, having an electric motor which is directly connected with an engine mounted on the vehicle and has both driving and power-generating functions, comprising:

a motor controller that executes automatic start-up/stop control of said engine, and in start-up of the engine starts the engine with a starter motor by operation of a key and by operation of said electric motor, wherein while the engine is stopped by operation of automatic start-up/stop control, at restarting of the engine when a start-up condition is satisfied, the controller starts the engine using only the electric motor, and while the engine is stopped by operation of the automatic start-up/stop control, at restarting of the engine when the start-up condition is not satisfied, the controller drives the starter motor and the electric motor by outputting an engine activation signal so that the electric motor assists engine restart after engine speed exceeds a predetermined speed.

2. The control apparatus for a hybrid vehicle as defined in claim 1, wherein said motor controller delays driving of said electric motor until the engine activation signal is output for a predetermined time.

3. The control apparatus for a hybrid vehicle as defined in claim 1, wherein in a restart of said engine when said start-up condition is satisfied while the engine is stopped by operation of the automatic start-up/stop control, said motor controller stops driving of said electric motor when a start-up of said engine is not successful by said electric motor only during a predetermined time, and when start-up of said engine is obtained by operation of the key.

4. The control apparatus for a hybrid vehicle as defined in claim 1, wherein when the key inputs an engine drive signal to said starter motor, said motor controller starts driving said electric motor after a rotation condition indicating that said starter motor begins to drive is satisfied.

5. The control apparatus for a hybird vehicle as defined in claim 1, wherein said start-up condition is satisfied when all of the following conditions are met, said conditions being a) voltage of a main battery is equal to or greater than a predetermined voltage, b) engine water temperature is equal to or greater than a predetermined temperature, and c) torque is not within a torque limit.

6. A hybrid vehicle comprising:

an engine mounted on the vehicle;

an electric motor directly connected to a shaft of the engine, said electric motor having both driving and power-generating functions;

a starter motor for use in starting said engine and controllable by operation of a key; and a motor controller for executing automatic start-up/stop control of said engine, initial start-up of said engine occurring in response to operation of said key for controlling said starter motor and by said motor controller sensing operation of said key and controlling said electric motor, wherein, when said motor controller executes startup/stop control to stop said engine and said engine remains stopped, as a subsequent engine restart operation begins, if a start-up condition is satisfied the motor controller controls only the electric motor to restart the engine, and if the start-up condition is not satisfied the motor controller outputs an engine activation signal to drive the starter motor and controls driving of the electric motor to restart the engine.

7. The hybrid vehicle of claim 6, wherein said motor controller executes stopping of the engine while said vehicle is in an idling condition or the vehicle is in a stopped condition.

8. The hybrid vehicle of claim 6, wherein during the restart of said engine when the start-up condition is satisfied, said motor controller controls to stop driving of said electric motor when a start-up of said engine is not successful by said electric motor during a predetermined time.

9. The hybrid vehicle of claim 6, wherein at initial start-up of said engine, when said key inputs an engine drive signal to said starter motor, said motor controller starts driving of said electric motor after a rotation condition indicating that said starter motor begins to drive is satisfied.

10. The hybrid vehicle of claim 6, wherein said start-up condition is satisfied when a voltage of a main battery is equal to or greater than a predetermined voltage, engine water temperature is equal to or greater than a predetermined temperature, and torque is not within a torque limit.

11. The hybrid vehicle of claim 6, wherein said start-up condition includes a voltage of a main battery equal to or greater than a predetermined voltage.

12. The hybrid vehicle of claim 11, wherein said start-up condition includes an engine water temperature equal to or greater than a predetermined temperature.

13. The hybrid vehicle of claim 12, wherein said start-up condition includes a torque value that is not within a torque limit.

* * * * *